United States Patent
Ito

[15] 3,687,047
[45] Aug. 29, 1972

[54] INTERCHANGEABLE LENS CAPABLE OF CHANGE OVER BETWEEN AUTOMATIC AND MANUAL STOP OPERATIONS

[72] Inventor: Masaharu Ito, Kawasaki, Japan
[73] Assignee: Canon Kabushiki Kaisha, Tokyo, Japan
[22] Filed: Aug. 12, 1970
[21] Appl. No.: 63,177

[30] Foreign Application Priority Data
Aug. 22, 1969    Japan ..................... 44/79718

[52] U.S. Cl. .................. 95/64 D, 95/64 R, 95/64 B, 95/64 C
[51] Int. Cl. ............................................... G03b 9/07
[58] Field of Search .......... 95/64 B, 64 C, 64 D, 64 R

[56] References Cited
UNITED STATES PATENTS
3,199,425    8/1965    Starp ......................... 95/64 C
3,466,994    9/1969    Holderbaum ............. 95/64 B
3,517,594    6/1970    Kitai ......................... 95/64 C Primary Examiner—Samuel S. Matthews
Assistant Examiner—E. M. Bero
Attorney—Ward, McElhannon, Brooks & Fitzpatrick

[57] ABSTRACT

An interchangeable lens capable of change over between automatic and manual diaphragm stop operations includes a diaphragm actuator ring and an automatic diaphragm interlocking member. Said actuator ring is normally urged in stop-down direction and engaged by said interlocking member which normally holds the actuator ring in a fully opened position with the aid of a spring being driven by a stop lever in a camera for automatic aperture stop operation. The interlocking member is displaceable to a position beyond its operating range and is clamped in that position for manual aperture stop operation, whereby the lens can be readily and simply changed over between automatic and manual stop operations.

2 Claims, 2 Drawing Figures

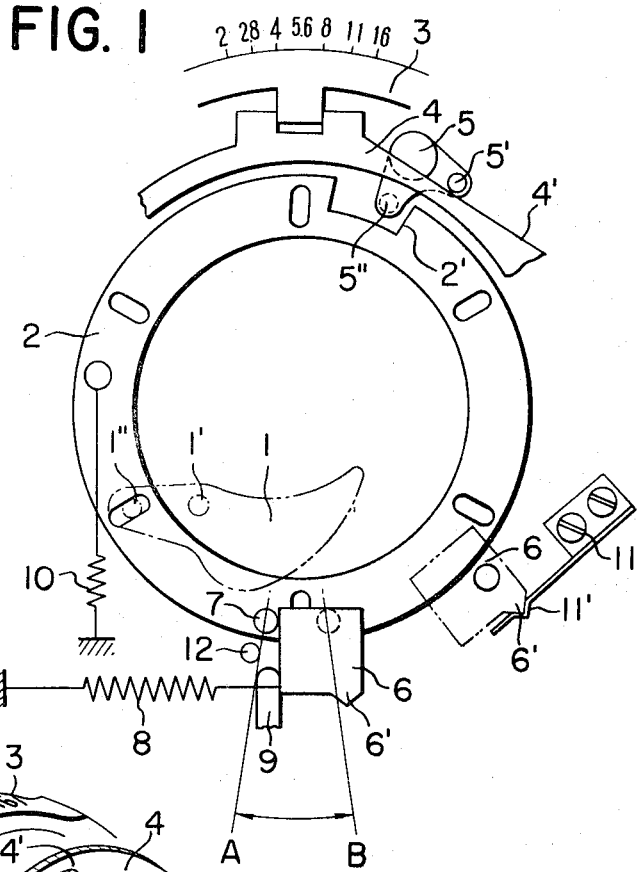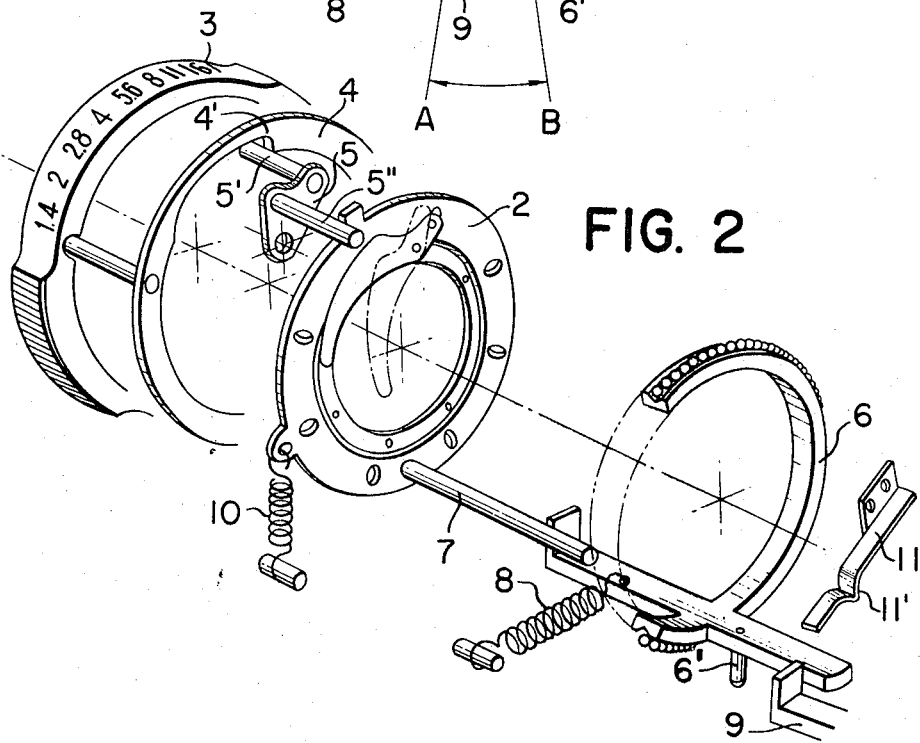

INTERCHANGEABLE LENS CAPABLE OF CHANGE OVER BETWEEN AUTOMATIC AND MANUAL STOP OPERATIONS

BACKGROUND OF THE INVENTION

1. FIELD OF THE INVENTION

This invention relates to an interchangeable lens for use with a single-lens reflex camera, and more particularly to a change-over device for changing over such lens between automatic and manual stop operations.

2. DESCRIPTION OF THE PRIOR ART

A preset type automatic diaphragm has usually been used with a single-lens reflex camera, whereas this has often involved the necessity of manually operating the diaphragm in order to ascertain the depth of field or to effect the stop-down photometry through the TTL (through the lens metering) system. The manual adjustment of the diaphragm is also required when use is made of a bellows having no diaphragm interlocking means or of an intermediate ring or the like.

SUMMARY OF THE INVENTION

The present invention provides a simply constructed interchangeable lens which can be readily changed over between automatic and manual stop operations as desired.

To achieve such an object, the change-over device of the present invention comprises a diaphragm actuator ring, an automatic diaphragm interlocking member, and clamp means all of which are located in the lense tube of the objective. Said actuator ring is normally urged in a stop-down direction, and said interlocking member engages said diaphragm actuator ring to normally hold the latter in a fully opened position with the aid of a spring, said interlocking member being driven by an automatic stop lever provided in a camera, said interlocking member being displaceable to a position beyond its operating range, and said clamp means clamping said interlocking member in said latter position.

The invention will be described in greater detail with respect to an embodiment thereof shown in the accompanying drawings.

BRIEF DESCRIPTION OF THE DRAWINGS

FIG. 1 is a schematic front view showing the essential portion of the change-over device according to an embodiment of the present invention.

FIG. 2 is an exploded perspective view of the device shown in FIG. 1.

DESCRIPTION OF THE PREFERRED EMBODIMENTS

Referring to FIG. 1, there is seen a diaphragm leaf 1 although a plurality of such diaphragm leaves is actually provided within a lens tube of an interchangeable objective lens. The diaphragm leaf 1 is pivotally mounted by means of a pivot pin 1' and has a pin 1'' studded therein. The pin 1'' is received in a slot formed in a diaphragm actuator ring 2 so that the diaphragm leaf 1 may be rotated about the pivot pin 1' upon counter-clockwise rotation of the diaphragm actuator ring 2. The actuator ring 2 is normally urged by a spring 10 in a counter-clockwise direction, i.e., in the stop-down direction. An aperture ring 3 is connected to a cam ring 4 for rotation together with each other. The cam ring 4 has a cam surface 4' engaged by one end 5' of a bell crank 5. In FIG. 1 the cam surface 4' is provided by the outer surface of the cam ring 4, whereas it may be the inner surface of the cam ring as shown in FIG. 2, with substantially the same result as in FIG. 1. The bell crank 5 has a pin 5'' studded at the other end thereof so as to provide a stopper for cooperating with a recess 2' formed in the diaphragm actuator ring 2.

An interlocking plate 6 is provided at the rear end of the lens tube in such a manner that it is revolved about the optical axis. The interlocking plate 6 engages a pin 7 studded in the diaphragm actuator ring 2 and an automatic stop lever 9 is movably mounted to a camera, so as to maintain the diaphragm actuator ring 2 in a fully opened position with the aid of a spring 8 which is secured to the interlocking plate 6 at one end and to a fixed portion of the lens tube at the other end of which has a greater spring force than the spring 10.

A clamp spring 11 having a V-shaped groove formed therein for clamping the corresponding projection 6' of the interlocking plate is mounted on the lens tube. A stop-down lever 12 for photometry is further provided in the camera for engagement with the interlocking plate 6 of the lens tube of the interchangeable objective lens.

To effect automatic stop operation with the above-described arrangement, the diaphragm actuator ring 2 is set so that the pin 7 thereof lies in a fully opened position A, and the aperture ring 3 may be rotated until the scale thereon is adjusted to a desired aperture value. This in turn causes the cam ring 4 to be rotated so as to determine the position of the stopper 5'' of the bell crank 5 which is in engagement with the cam surface 4'. Upon shutter release, the automatic stop lever 9 is rightwardly moved a predetermined distance against the force of the spring 8, whereby the diaphragm actuator ring 2 is rotated counter-clockwise with the aid of the spring 10 until the rotation is blocked by the engagement taking place between the recess 2' of the diaphragm actuator ring 2 and the stopper 5'' of the bell crank 5. Thus the lens aperture is determined.

After the shutter action when the automatic stop lever 9 is returned to its initial position, the interlocking lever 6 is pulled back by the spring 8 to thereby return the diaphragm actuator ring 2 to its fully opened position A against the force of the spring 10, since the force of the spring 8 overcomes that of the spring 10.

The pin 7 of the actuator ring 2 is allowed to move over the range from the fully opened position A to the minimum aperture position B. To effect the manual stop operation, the stop-down lever 12 for photometry is actuated to allow the interlocking plate 6 to move rightwardly beyond the limit position B of the pin 7 into a position as indicated by phantom lines, whereupon the interlocking plate 6 is clamped in the latter position by the clamp spring 11. Thus, the diaphragm actuator ring 2 is also rotated counter-clockwise or in the stop-down direction by the force of the spring 10 until the rotation is blocked by the engagement taking place between the recess 2' and the stopper 5''. The aperture ring 3 is then rotated to a desired aperture value, whereby the bell crank 5 is also displaced and in response thereto the diaphragm actuator ring 2 is rotated until the diaphragm leaf 1 is stopped at a desired value.

Such a lens device may be mounted to a bellows having no diaphragm interlocking means by manually rotating the interlocking plate beforehand and clamping it as described, whereby the aperture may be determined through the manual operation.

Thus, according to the present invention, the interlocking plate, which engages the diaphragm actuator ring normally urged in the stop-down direction and normally holds the actuator ring in fully opened position, is movable to a position beyond its operating range, and clamp means is provided to clamp the displaced interlocking plate in the latter position. Thus, the present invention can provide an expedient interchangeable lens which is simple in construction and can be readily changed over between automatic and manual stop operations.

What is claimed is:

1. An interchangeable lens attachment for a camera which can be converted from manual to automatic-stop operation which comprises:

a lens tube housing an objective lens and adapted to be attached to a camera;

a diaphragm actuator ring positioned in said lens tube and normally biased in a stop-down direction;

an automatic diaphragm interlocking member in said lens tube for engaging said diaphragm actuator ring biased to normally hold the latter in a fully opened position, said interlocking member being drivingly engageable with an automatic stop lever in said camera for automatic aperture stop operation and being displaceable to a position beyond its operation range to permit manual aperture stop operation; and clamping means mounted within said lens tube and arranged to engage and hold said interlocking member in its displaced position for manual aperture stop operation.

2. The device of claim 1 wherein said actuator ring and interlocking member are biased by means of springs with said interlocking member spring having greater force then said actuator ring spring.

* * * * *